United States Patent
Kusumoto (10) Patent No.: US 9,904,865 B2
(45) Date of Patent: Feb. 27, 2018

(54) SETTING APPARATUS WHICH SETS A DETECTION REGION FOR A DETECTION PROCESS

(71) Applicant: CANON KABUSHIKI KAISHA, Tokyo (JP)

(72) Inventor: Hiroshi Kusumoto, Kokubunji (JP)

(73) Assignee: Canon Kabushiki Kaisha, Tokyo (JP)

( * ) Notice: Subject to any disclaimer, the term of this patent is extended or adjusted under 35 U.S.C. 154(b) by 338 days.

(21) Appl. No.: 14/290,688

(22) Filed: May 29, 2014

(65) Prior Publication Data

US 2014/0355828 A1    Dec. 4, 2014

(30) Foreign Application Priority Data

May 31, 2013   (JP) ................................. 2013-115668

(51) Int. Cl.
    *G06K 9/00*     (2006.01)
    *G06K 9/20*     (2006.01)

(52) U.S. Cl.
    CPC ....... *G06K 9/2081* (2013.01); *G06K 9/00771* (2013.01)

(58) Field of Classification Search
    CPC ................... G06K 9/2081; G06K 9/00771
    See application file for complete search history.

(56) References Cited

U.S. PATENT DOCUMENTS

| 5,590,248 A * | 12/1996 | Zarge ...................... G06T 17/20 345/420 |
| 6,346,949 B1 * | 2/2002 | Fujiwara ................. G06T 17/20 345/589 |
| 8,233,047 B2 * | 7/2012 | Shimbo .............. G06K 9/00771 348/149 |
| 8,792,680 B2 * | 7/2014 | Karazi ...................... G01S 5/16 382/103 |
| 2001/0025298 A1 * | 9/2001 | Masukura ................. G06T 7/20 709/203 |
| 2003/0025794 A1 * | 2/2003 | Fujii ...................... G06T 7/2006 348/169 |
| 2004/0125984 A1 * | 7/2004 | Ito ......................... G01S 3/7864 382/103 |
| 2007/0024707 A1 * | 2/2007 | Brodsky ............ G08B 13/1961 348/143 |
| 2008/0018737 A1 | 1/2008 | Suzuki |

(Continued)

FOREIGN PATENT DOCUMENTS

JP          09044696 A   *  2/1997
JP       2001266159 A   *  9/2001

(Continued)

*Primary Examiner* — Sean Conner
*Assistant Examiner* — Pinalben Patel
(74) *Attorney, Agent, or Firm* — Canon USA, Inc. I.P. Division (57) ABSTRACT

A setting apparatus which sets a detection region for a detection process of detecting a change of an image within a detection region corresponding to an object of detection inputs a first image in which the object of detection is present and a second image in which the object of detection is not present and determines the detection region from the first image and the second image such that the detection process may be performed on a detection region of a third image.

20 Claims, 9 Drawing Sheets

(56) References Cited

U.S. PATENT DOCUMENTS

| | | | |
|---|---|---|---|
| 2009/0115786 A1* | 5/2009 | Shimasaki | G06T 17/20 345/441 |
| 2012/0026308 A1* | 2/2012 | Johnson | G06K 9/00369 348/77 |
| 2012/0051594 A1* | 3/2012 | Kim | G06K 9/00771 382/103 |
| 2012/0106797 A1* | 5/2012 | Wang | H04N 7/18 382/103 |
| 2014/0266803 A1* | 9/2014 | Bulan | G06K 9/00785 340/932.2 |
| 2015/0003743 A1* | 1/2015 | Nosaka | G08B 13/19604 382/203 |

FOREIGN PATENT DOCUMENTS

| | | |
|---|---|---|
| JP | 2004-248090 A | 9/2004 |
| JP | 2008-182456 A | 8/2008 |

* cited by examiner

DOUGLAS-PEUCKER ALGORITHM

SETTING APPARATUS WHICH SETS A DETECTION REGION FOR A DETECTION PROCESS

BACKGROUND OF THE INVENTION

Field of the Invention

The present invention relates to a setting apparatus and method which set a detection region corresponding to a detection process of detecting a change of an image within the detection region for an object of detection.

Description of the Related Art

In recent years, for shop surveillance or building surveillance, for example, a captured image may be analyzed, and when a specific event is detected, an image in which the event is occurring may be stored or may be viewed and checked by a person in charge. Such specific events to be analyzed may include removal detection which is detection of removal of an object of surveillance, for example.

U.S. Patent Application Publication No. 2008/0018737, for example, discloses a function of detecting removal of an object of surveillance.

However, in a case where an operator uses a pointing device, for example, to set a detection region corresponding to an object of detection within a video image, complicated operations are involved, imposing loads on the operator. Incorrect setting of such a detection region may result in lower accuracy of detection.

SUMMARY OF THE INVENTION

The present invention may reduce the number of steps of a region-setting procedure by an operator.

The present invention may further prevent deterioration of accuracy of detection.

An aspect of the present invention may provide a setting apparatus which sets a detection region for a detection process of detecting a change of an image within a detection region corresponding to an object of detection, the apparatus including an input unit usable for inputting a first image in which the object of detection is present and a second image in which the object of detection is not present, and a determination unit configured to determine the detection region from the first image and the second image such that the detection process may be performed on a detection region of a third image.

Another aspect of the present invention may further provide a method for determining a detection region in a setting apparatus which sets a detection region for a detection process of detecting a change of an image within a detection region corresponding to an object of detection, the method including inputting a first image in which the object of detection is present and a second image in which the object of detection is not present, and determining the detection region from the first image and the second image such that the detection process may be performed on a detection region of a third image.

Further features of the present invention will become apparent from the following description of exemplary embodiments with reference to the attached drawings.

DESCRIPTION OF THE EMBODIMENTS

Figure 1:
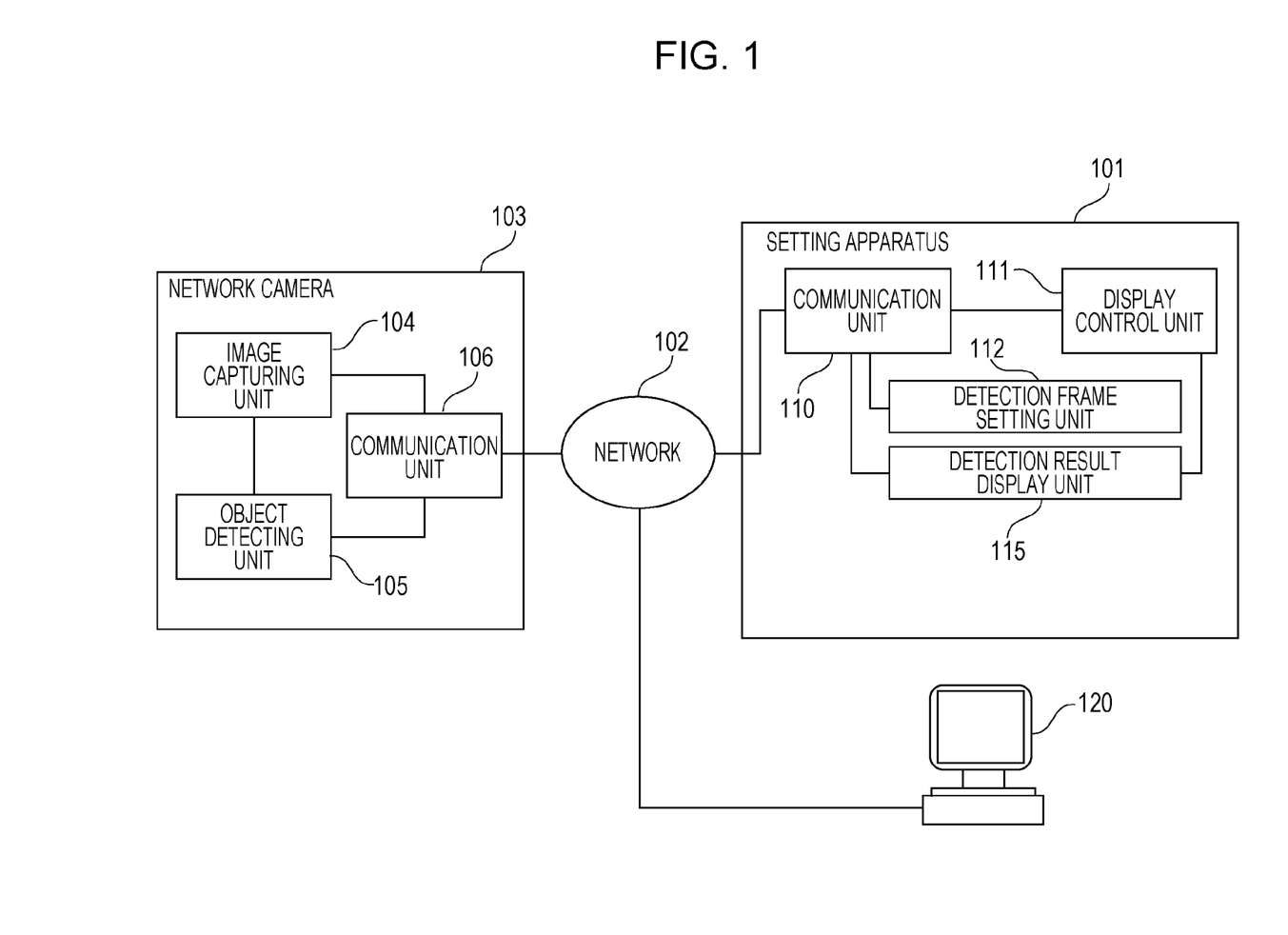
FIG. 1 is a software configuration diagram according to an embodiment of the present invention.

FIG. 1 is a software configuration diagram of an object detection system which provides a removal detection function according to a first embodiment of the present invention.

Referring to FIG. 1, the object detection system includes a setting apparatus 101, a network 102, a network camera 103, and a client terminal 120. On the setting apparatus 101, an object detection function setting tool runs which is configured to display a video image based on video data from the network camera 103 and provide a user interface for setting an object detection function for monitoring of removal of an object. The network 102 is a network that supports IP-based communication such as a LAN and the Internet.

The network camera 103 has a video image capturing function and an object detection function and delivers a live image and detected object information regarding a detected object to the setting apparatus 101 and the client terminal 120 through the network 102. The setting apparatus 101 and client terminal 120 display a video image based on video data delivered from the network camera 103 and a detection result based on detected object information.

When removal of an object is detected, the network camera 103 transmits detected object information to the setting apparatus 101. When the setting apparatus 101 receives the detected object information, the setting apparatus 101 displays a detection region frame and indicates that the object has been removed. In this case, the detection region frame is displayed in a different color from the color of the detection region frame while it is being set. The setting apparatus 101 is a display control apparatus configured to display a video image and detected object information. The network camera 103 has an image capturing unit 104, an object detecting unit 105, and a communication unit 106.

It should be noted that the object detecting unit 105 may be provided in the setting apparatus 101 instead of in the network camera 103.

The image capturing unit 104 acquires a live image by using an image capturing device. The image capturing unit 104 may be capable of acquiring a live image of 30 frames per second, for example. The image capturing unit 104 according to this embodiment encodes a live image acquired from an image capturing device to a JPEG image and converts it to digital video data that may be delivered over a network. Such a conversion function may be provided in the communication unit 106.

The object detecting unit 105 analyzes the video data acquired by the image capturing unit 104 and detects whether an object within a detection region identified by the detection setting information set by the setting apparatus 101 has been removed or not. If a video image within the detection region has changed, the object detecting unit 105 detects that the object has been removed.

The object detecting unit 105 of this embodiment detects removal of an object by analyzing a difference between consecutive video frames. Various methods may be applicable as the object removal detection algorithm, such as a method in which a difference between video data acquired by image capturing and a preset reference video image is analyzed.

The communication unit 106 transmits video data acquired by the image capturing unit 104 and detected object information generated by the object detecting unit 105 to the client terminal 120 and setting apparatus 101 through the network 102. The communication unit 106 further receives detection setting information set by a user by using the setting apparatus 101 and sets it in the object detecting unit 105.

The communication unit 110 receives video data and detected object information transmitted from the network camera 103. The communication unit 110 further transmits detection setting information set by a user by using the setting apparatus 101 to the network camera 103. The display control unit 111 displays a video image based on video data delivered from the network camera 103 on a display device such as a display.

A detection frame setting unit 112 sets a detection region on a video image as detection setting information. The term "detection region" refers to a region where an object is to be detected within a video image. In other words, setting a detection region allows setting not all but a part of a video image (of an object to be monitored for removal) as an object of detection. From this, an improvement of accuracy of object detection and reduction of the processing load may be expected.

The detection frame setting unit 112 causes the display control unit 111 to display a frame indicating a detection region on a video image.

Figure 3:
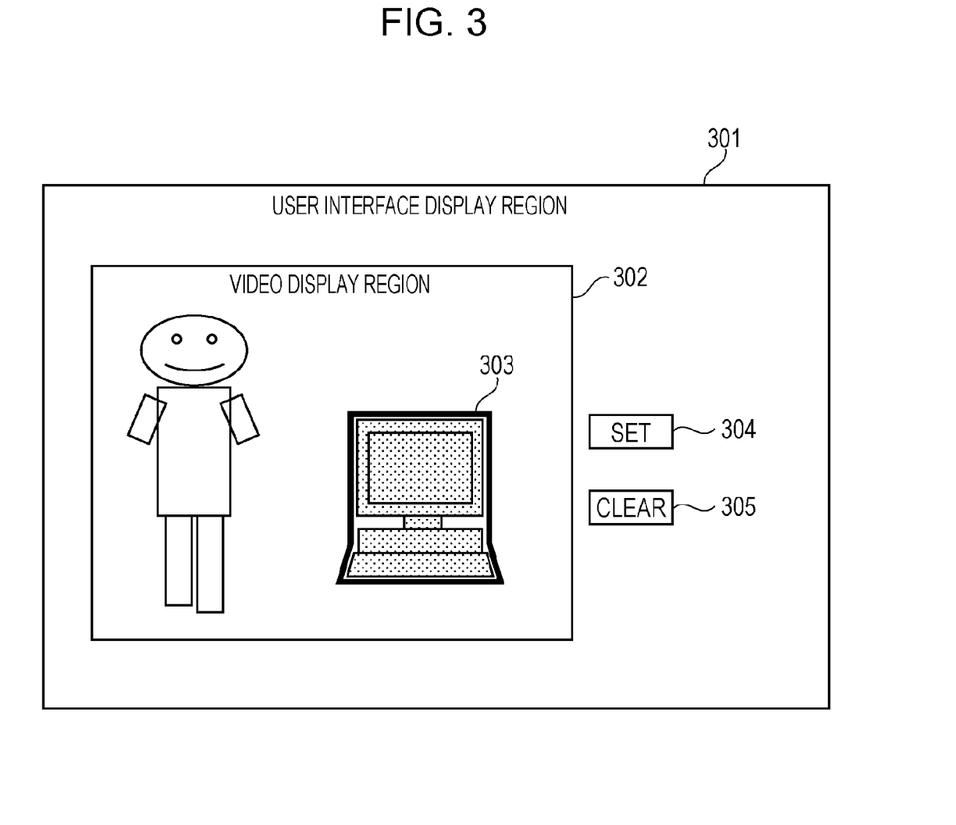
FIG. 3 is a user interface according to an embodiment of the present invention.

The display control unit 111 displays a video image from the network camera 103 in a video display region 302 (FIG. 3). The display control unit 111 displays a detection region frame 303 within the video display region 302. A display example by the display control unit 111 will be described below with reference to FIG. 3.

A detection result display unit 115 causes the display control unit 111 to display the detection region frame 303 based on a detection result from the object detecting unit 105 in the network camera 103 as a result of the determination on whether the object has been removed or not. In this manner, the setting apparatus 101 sets a detection region corresponding to an object of detection within a video image for detection of a change within the detection region.

The client terminal 120 receives video data and detected object information from the network camera 103 and displays the object detection result and the video image. In other words, the client terminal 120 has the communication unit 110, display control unit 111, and detection result display unit 115 among the components of the setting apparatus 101 and does not have the detection frame setting unit 112.

Figure 2:
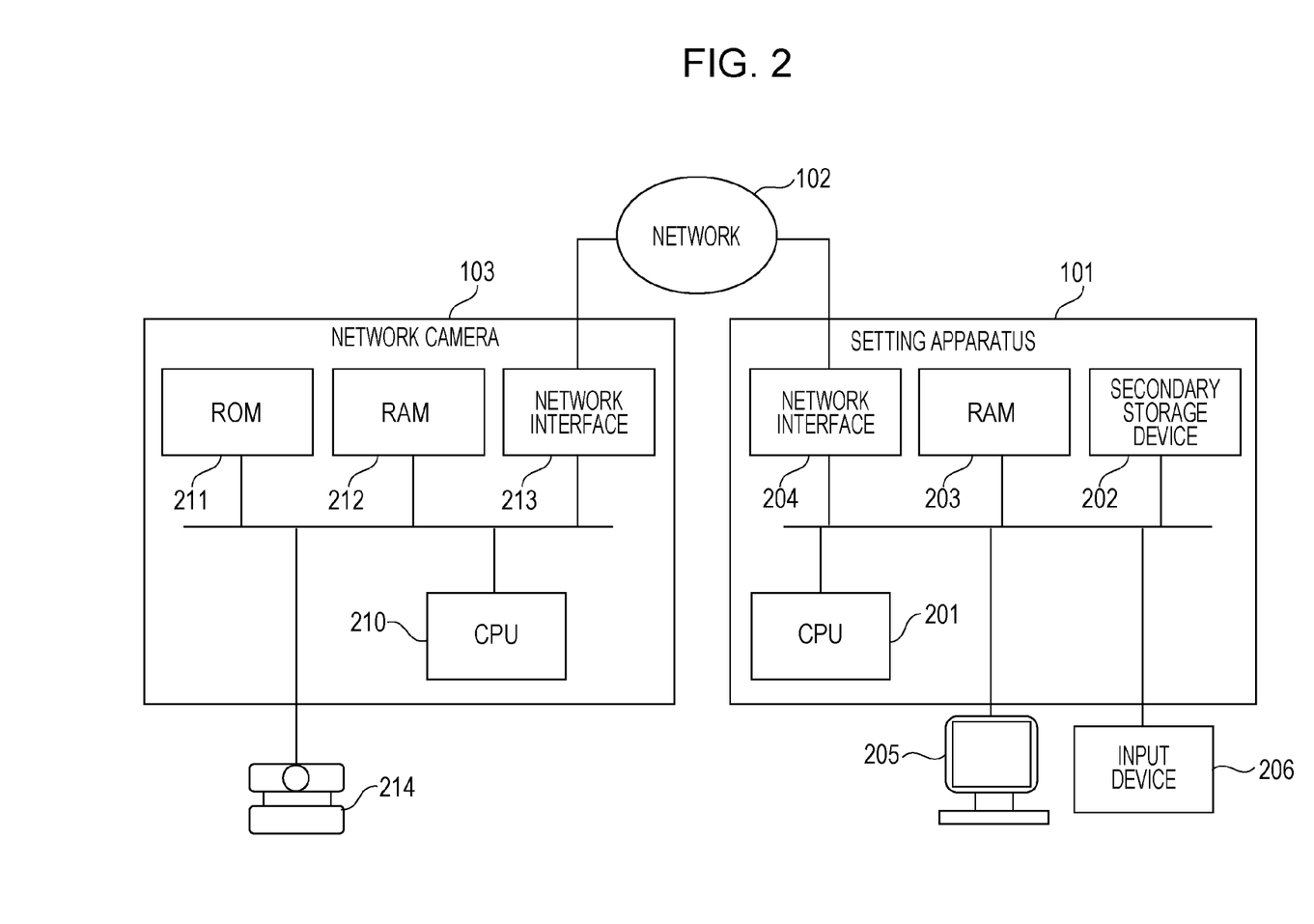
FIG. 2 is a hardware configuration diagram according to an embodiment of the present invention.

FIG. 2 illustrates hardware configurations of the setting apparatus 101 and the network camera 103. The client terminal 120 has the same hardware configuration as that of the setting apparatus 101. Referring to FIG. 2, a CPU 201 is a control processing device configured to control the setting apparatus 101 overall.

A secondary storage device 202 stores a program allowing the CPU 201 to control the setting apparatus 101. A RAM 203 is a memory configured to decompress a program read by the CPU 201 from the secondary storage device 202 and execute a process. The RAM 203 is also usable as a temporary memory functioning as a storage area for temporarily storing data to be processed.

A network interface 204 is a circuit usable for communication through the network 102. The network interface 204 is used for reception of video data and detected object information from the network camera 103 and transmission of detection setting information.

A display apparatus 205 is a display device such as a display configured to display a video image based on video data, for example. The setting apparatus 101 may be integrated with the display apparatus 205. An input device 206 may include a keyboard and a mouse, for example. The input device 206 may be a joystick, an audio input device or the like.

The setting apparatus 101 may be configured as a general personal computer (PC). An object detection function setting tool configured to provide a user interface for setting an object detection function for an object of monitoring for removal may be implemented as software capable of running on a general PC. Having described that according to this embodiment the CPU 201 reads out a program from the secondary storage device 202 and executes processes, at least a part of processes of the components in FIG. 1 may be performed by special hardware.

Next, a hardware configuration of the network camera 103 will be described. Referring to FIG. 2, a CPU 210 is a control unit configured to perform overall control of the network camera 103 overall.

A ROM 211 stores a program configured to allow the CPU 210 to control the network camera 103. A secondary storage device equivalent to the secondary storage device 202 may be provided instead of the ROM 211. A RAM 212 is a memory usable for decompressing a program read from the ROM 211 and executing a process. The RAM 212 is also usable as a temporary memory functioning as a storage area for temporarily storing data to be processed.

A network interface 213 is a circuit usable for communication through the network 102. The network interface 213 is used for transmission of video data and detected object information to the setting apparatus 101 and for reception of detection setting information.

An image capturing apparatus 214 has an image capturing device such as a video camera configured to capture a live image as a moving image and still images. The network camera 103 and the image capturing apparatus 214 may be provided integrally or may be provided separately.

Next, with reference to FIG. 3, a user interface of the setting apparatus 101 will be described. The setting apparatus 101 executes an object detection function setting tool that is a computer program configured to display a video image from the network camera 103 on the display apparatus 205. A user interface illustrated in FIG. 3 is displayed on a screen of the display apparatus 205 in FIG. 2 under control of the display control unit 111 in FIG. 1. The setting apparatus 101 and the display apparatus 205 may be provided integrally or separately. The setting apparatus 101 is a display control apparatus configured to display a video image on the display apparatus 205.

Referring to FIG. 3, a user interface display region 301 is a display region on a display of the display apparatus 205. The user interface display region 301 may be displayed fully or may be displayed as one window.

A video display region 302 is a region for displaying a video image (live image) based on video data delivered from the network camera 103.

A detection region frame 303 (frame indicated by a thin line in FIG. 3) is a frame defining a subject region of an object detection process by the object detecting unit 105 in accordance with a setting by the detection frame setting unit 112. The detection region frame 303 is displayed by the display control unit 111 based on a setting by the detection frame setting unit 112 and the detection result display unit 115.

When a detection region set button 304 is pressed or clicked, the detection frame setting unit 112 sets a detection region frame for an object of removal detection which is a subject of detection setting information, and the resulting frame is displayed as the detection region frame 303. The size and form may be changed by selecting and dragging a vertex or vertices or a border of the detection region frame 303 by using the input device 206 such as a mouse.

When a detection region clear button 305 is pressed or clicked, the detection frame setting unit 112 cancels a setting for the detection region frame being a subject of the detection setting information and stores an image displayed on the video display region 302 as a background in the RAM 203.

Figure 4:
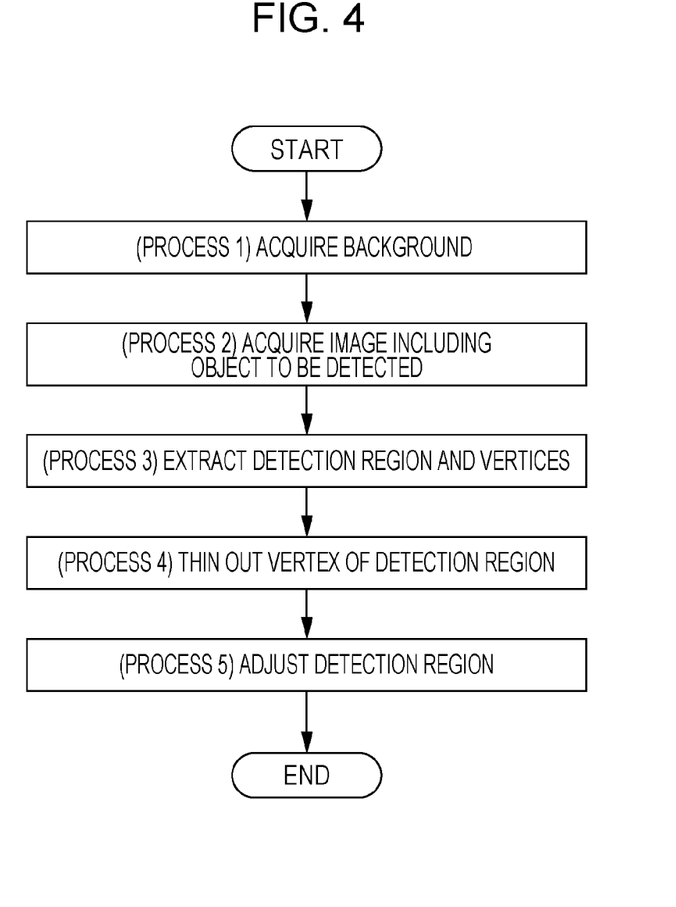
FIG. 4 illustrates processing steps according to an embodiment of the present invention.

FIG. 4 illustrates processing steps for explaining processing of creating detection setting information for the detection region frame 303 performed by the setting apparatus 101 according to this embodiment. In the setting apparatus 101, an object detection function setting tool operates which is configured to display a video image from the network camera 103. The processing in FIG. 4 is performed in accordance with operations performed by an operator and the object detection function setting tool program recorded in the secondary storage device 202 and read to the RAM 203 and executed by the CPU 201. However, at least a part of the processing performed by the CPU 201 and CPU 210 of the processing in FIG. 4 may be performed by special hardware. The setting apparatus 101 sets a detection region for an object of detection within a video image for detection of a change within the detection region in the following manner.

(Process 1) Acquisition of Background

Figure 5:
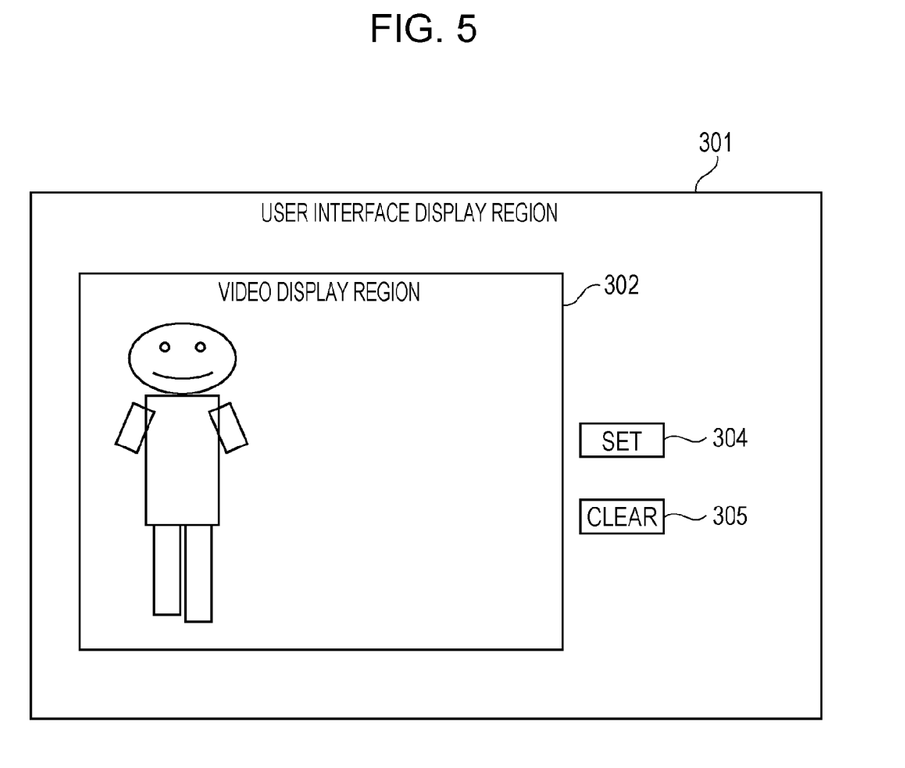
FIG. 5 is an explanatory diagram of process 1 according to an embodiment of the present invention.
Figure 6:
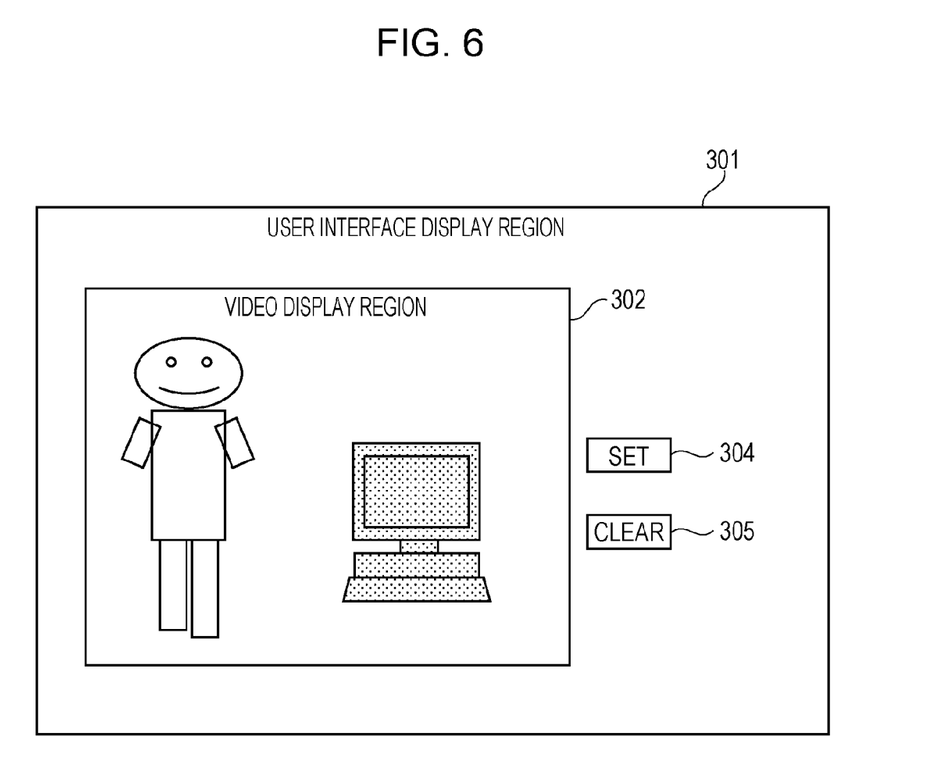
FIG. 6 is an explanatory diagram of process 2 according to an embodiment of the present invention.

A background acquisition process will be described with reference to FIG. 5. In this example, an object such as a PC placed on the right side of a person shown in the video display region 302 in FIG. 6 is an object of removal detection. The object of removal detection is saved to a part which is not shown in the video display region 302, and the detection region clear button 305 is then pressed (FIG. 5). In response to pressing of the detection region clear button 305, the detection frame setting unit 112 acquires an image captured by the image capturing unit 104 and shown in the video display region 302 and stores it as a background image in the RAM 203.

In this process, frames for a predetermined period of time (such as 10 seconds) or a predetermined number of frames (such as 300 frames) may be input, and a background image may be created based on the input frames. The input frames may be simply averaged or may be weight averaged with a predetermined weight. This background creation may be performed by the detection frame setting unit 112, or a background captured by the network camera 103 may be acquired by the detection frame setting unit 112. The currently set detection region is cleared if a detection region is set and the detection region clear button 305 is then pressed.

(Process 2) Acquisition of Image Including Object of Detection

A process of acquiring an image including an object of detection will be described with reference to FIG. 6.

An object of removal detection is placed at a predetermined position within the video display region 302, and the detection region set button 304 is then pressed. In response to pressing of the detection region set button 304, the detection frame setting unit 112 acquires an image captured by the image capturing unit 104 and shown in the video display region 302 and stores it in the RAM 203. Also in this process, frames for a predetermined period of time (such as 10 seconds) or a predetermined number of frames (such as 300 frames) may be input, and an image to be stored may be created based on the input frames. The input frames may be simply averaged or may be weight averaged with a predetermined weight. This background image creation may be performed by the detection frame setting unit 112, or a background image captured by the network camera 103 may be acquired by the detection frame setting unit 112.

In this manner, a video image in which an object of detection is present and a video image in which the object of detection is not present are input through the communication unit 110 in processes 1 and 2.

(Process 3) Extraction of Detection Region and Vertices

Figure 7:
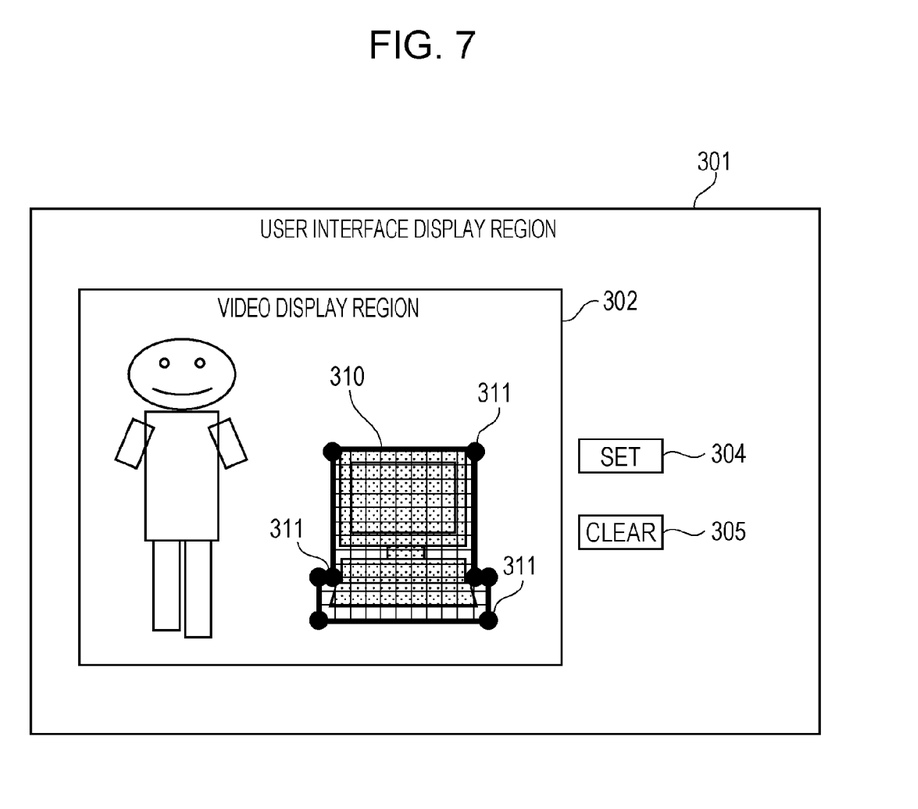
FIG. 7 is an explanatory diagram of process 3 according to an embodiment of the present invention.

A process of extracting a detection region and vertices will be described with reference to FIG. 7.

The detection frame setting unit 112 handles the image stored in process 1 as a background image and extracts a region in which there is a difference between the background image and the image stored in process 2. In FIG. 7, the images stored in process 1 and process 2 are divided into blocks, and a block having a difference is extracted as a difference region 310. The difference region 310 may be extracted in the form of pixels. In this manner, the detection frame setting unit 112 extracts a difference between a video image in which an object of detection is present and a video image in which it is not present. According to this embodiment, a polygon corresponding to a region determined as having a difference is created.

Processes 1 to 3 may be executed in the network camera 103, and a result therefrom may be acquired by the detection frame setting unit 112. A detection region frame may be set by the network camera 103.

When the difference region 310 is extracted, a line connecting vertices 311 surrounding the region is extracted.

(Process 4) Thinning of Vertex of Detection Region

Thinning of vertices of a detection region will be described with reference to FIG. 8.

In a case where the difference region 310 extracted in process 3 has a complicated form, problems may occur including an increased load on the system, insufficient display capabilities and part of the resulting displayed video image not appearing. In order to solve such problems, an inclusion ratio and a coverage are defined as will be described below, and threshold values are defined for the number of vertices, inclusion ratio, and coverage to reduce the number of vertices and loads on the system.

Those threshold values may be held in a fixed manner in the secondary storage device 202 in the setting apparatus 101, or an interface may be provided which allows them to be changed externally to the setting apparatus 101.

In this case, the inclusion ratio and the coverage may be expressed by Expression 1 and Expression 2:

Inclusion Ratio=an area of a region surrounded by the detection region frame 303 within the difference region 310/an area of the difference region 310     (Expression 1)

Coverage=an area of the difference region 310 within the detection region frame 303/an area of a region surrounded by the detection region frame 303    (Expression 2).

The detection frame setting unit 112 calculates thin distances between the vertices 311. The calculation of a thin distance according to this embodiment uses Douglas-Peucker algorithm. The detection frame setting unit 112 calculates thin distances between the vertices 311 illustrated in FIG. 8B, sorts the calculated thin distances between the vertices 311 in increasing order, and thins out a vertex having the shortest thin distance to reduce the number of vertices. The thin distance is the distance illustrated in FIG. 8B. The detection frame setting unit 112 connects the vertices across the reduced vertex and extracts the detection region frame 303 based on the remaining vertices (FIG. 8A). A thin distance of a vertex is a distance between a straight line connecting two vertices adjacent to the vertex and the vertex.

Thus, the detection frame setting unit 112 reduces the number of vertices of a polygon calculated from a difference between a video image in which an object of detection is present and a video image in which it is not present to a predetermined number of vertices. In other words, the detection frame setting unit 112 deletes vertices in increasing order of distance between a straight line connecting two vertices adjacent to a vertex and the vertex such that the number of vertices may be made equal to or lower than a predetermined number of vertices. Thus, the detection frame setting unit 112 calculates a detection region (frame) which is a polygon having a number of vertices that is equal to or lower than the predetermined number of vertices.

A method of reducing the number of vertices will be described below with reference to FIG. 8C.

The detection frame setting unit 112 continues thinning out the vertices 311 until the number of vertices 311 becomes lower than a threshold value for the number of vertices stored in the RAM 203 (S801). This thinning of vertices may be based on Minimum Distance method or Minimum Ratio method which is used for simplifying lines on a map. In this manner, the detection frame setting unit 112 calculates a detection region being a polygon having a predetermined number of vertices or less.

The detection frame setting unit 112 acquires the inclusion ratio and coverage of the difference region 310 extracted in process 3 and the detection region frame 303 extracted in the step after the number of vertices 311 becomes lower than the threshold value for the number of vertices by using Expressions 1 and 2 above.

If the inclusion ratio and coverage are lower than their corresponding predetermined threshold values stored in the RAM 203 (S805), the detection frame setting unit 112 outputs a message to the display apparatus 205 and stops the processing (S802).

If the inclusion ratio and coverage are both equal to or higher than the threshold values (S806), the detection frame setting unit 112 again calculates thin distances between the remaining vertices 311 that have not been thinned out and extracts a detection region resulting from the thinning out of the vertex with the shortest thin distance (S803). The detection frame setting unit 112 calculates an inclusion ratio and coverage therefor. If the inclusion ratio and coverage are equal to or higher than the threshold values therefor (S806), the detection frame setting unit 112 defines the detection region resulting from the vertex thinning as the detection region frame 303 to reduce the number of vertices 311 in a range where the inclusion ratio and coverage therefor are not lower than the threshold values (S803).

If one of the inclusion ratio and coverage is lower than the corresponding threshold value (S806), the detection frame setting unit 112 settles the detection region frame 303 created in step S803 or S801 as the final detection region frame 303 in process 4 (S804).

The display control unit 111 displays the positions of the vertices that have not been thinned out and remain within the extracted detection region frame 303 and lines between the vertices on the display apparatus 205.

If it is determined in step S801 that the number of vertices of a polygon corresponding to a region judged as having a difference in process 3 is equal to or lower than the threshold value and if it is determined in step S806 that the inclusion ratio and coverage are lower than the threshold values when the number of vertices is reduced, the polygon corresponding to a region judged as having a difference in process 3 is defined as a detection region frame.

Even when the number of vertices 311 is not lower than the threshold value for the number of vertices, the inclusion ratio and coverage may be calculated, and the number of vertices may be reduced in a range where the inclusion ratio and coverage are higher than the threshold values therefor to define the detection region frame 303.

In this manner, the detection frame setting unit 112 calculates a first polygon from a difference between a video image in which an object of detection is present and a video image in which it is not present and calculates a detection region (frame) which is a second polygon acquired by reducing the number of vertices of the first polygon in a range where the second polygon overlaps the first polygon at a predetermined ratio or higher.

(Process 5) Adjustment of Detection Region

Adjustment of a detection region will be described with reference to FIGS. 8A to 8C and 3.

The detection region frame 303 (FIG. 8A) extracted in process 4 is displayed on the display apparatus 205 under control of the display control unit 111.

The detection frame setting unit 112 changes the detection region frame 303 in response to an instruction given by changing a vertex or a line connecting vertices of the detection region frame 303 by using a pointing device such as a mouse. In a case where a vertex A is moved, lines AB and AC connecting two vertices B and C adjacent to the vertex A and the vertex A are changed to connect the moved vertex A and the vertices B and C.

In a case where one point F of a line connecting two vertices D and E is caught and moved with a mouse, the point caught with the mouse is defined as a new vertex F between the vertices D and E, and the line connecting the vertices D and E is changed to a line connecting the vertices D and F and a line connecting the vertices F and E. However, if the number of vertices is higher than the threshold value in step S801 in FIG. 8C when the vertex F is added, the vertex F is not added. If the number of vertices is higher than the threshold value when a vertex is added, a message notifying that the addition of the vertex is not allowed is displayed on the user interface display region 301.

Figure 8A:
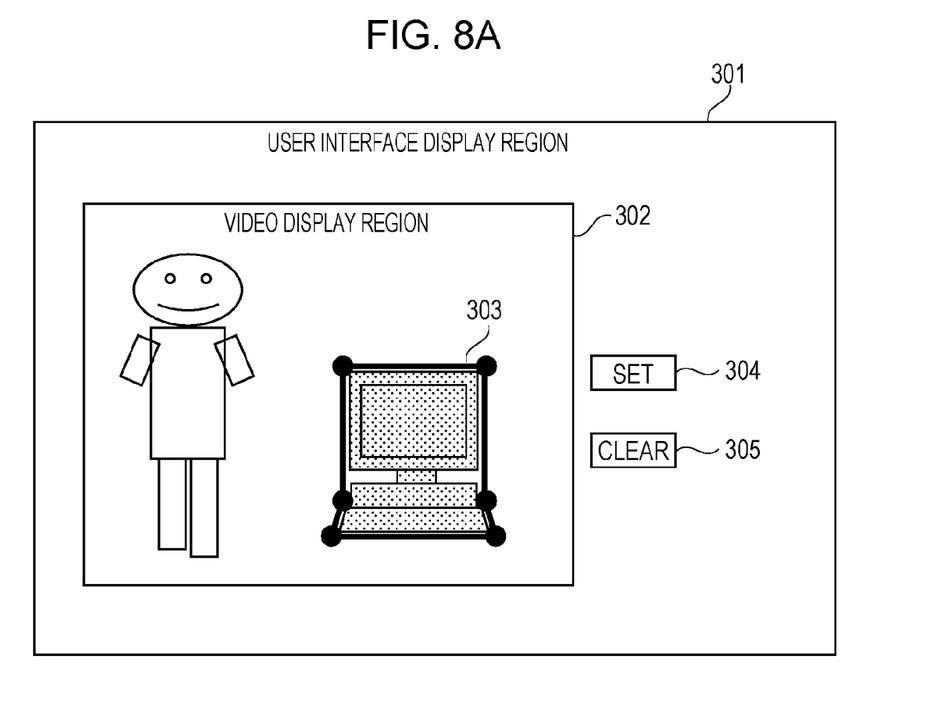
FIGS. 8A to 8C are explanatory diagrams of process 4 according to an embodiment of the present invention.
Figure 8B:
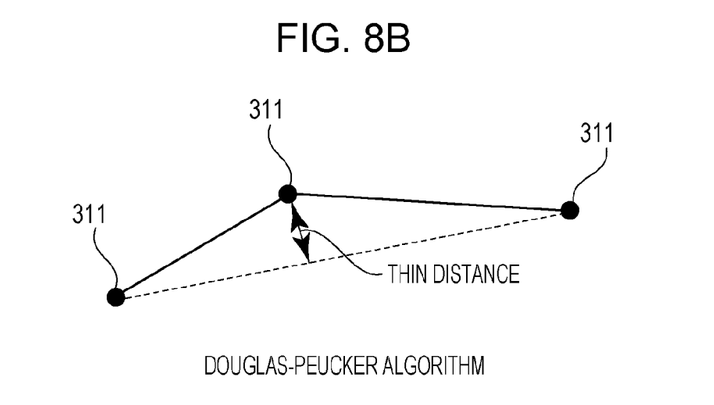
Figure 8C:
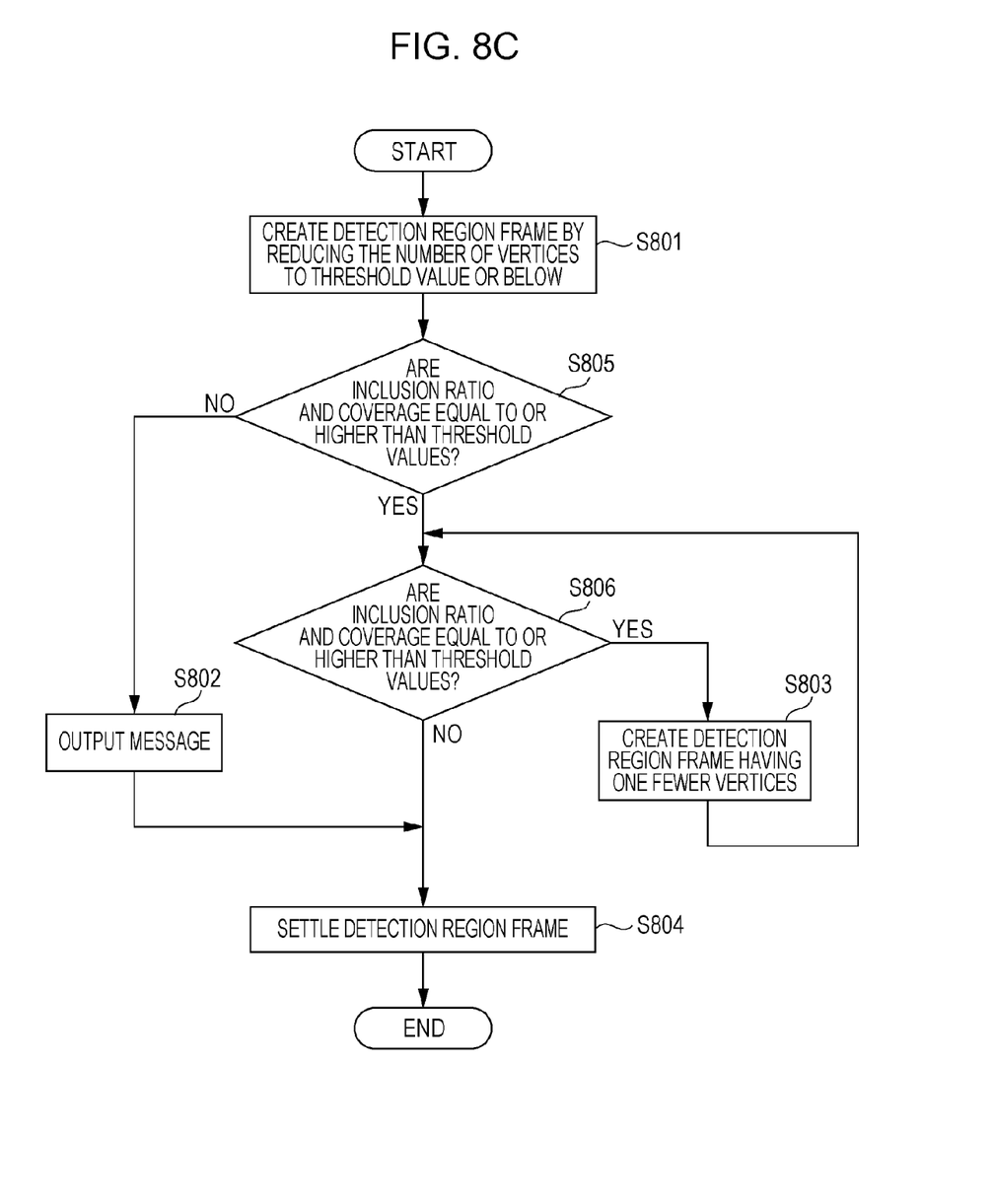

The detection frame setting unit 112 displays the detection region (frame) on a video image as illustrated in FIG. 8A to change the detection region (frame) displayed on the video image.

The detection frame setting unit 112 settles the detection region frame 303 if the detection region set button 304 is pressed (FIG. 3). In a case where a user judges that adjustment is not necessary for the detection region frame calculated in process 4, the user does not perform the adjustment in process 5.

The detection frame setting unit 112 transmits detection setting information to the object detecting unit 105 if the detection region frame 303 is settled. The object detecting unit 105 extracts an image of the detection region frame 303 set in the detection setting information from the image acquired in process 2 and compares the extracted image and the image captured by the image capturing unit 104.

This allows detection of removal of an object of detection within the detection region frame 303. The object detecting unit 105 may be provided in the setting apparatus 101 instead of in the network camera 103.

In this manner, the detection frame setting unit 112 calculates a detection region corresponding to an object of detection from a difference between a video image in which the object of detection extracted in process 3 is present and a video image in which it is not present.

Use of the function of setting a removal detection range according to this embodiment may allow setting of a removal detection region imposing less load on the system and having predetermined inclusion ratio and coverage or higher, which may eliminate the necessity for complicated operations, as described above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-115668, filed May 31, 2013, which is hereby incorporated by reference herein in its entirety.

What is claimed is:

1. A setting apparatus which sets a detection region for a detection process of detecting a change of an image within the detection region corresponding to an object to be detected, the apparatus comprising:
an interface configured to connect an image capture unit from which a first image in which the object to be detected is present and a second image in which the object to be detected is not present are input; and
a processor, operatively coupled to a memory, and configured to determine a polygon corresponding to the object to be detected, based on the first image and the second image, and to delete vertices of the polygon in increasing order of distance between a vertex of the polygon and a straight line connecting two vertices adjacent to the vertex such that the detection process of detecting the change in a third image is performed within the detection region of the polygon with the vertices of not more than a predetermined number.

2. The setting apparatus according to claim 1, wherein the processor is configured to allow a user to change the detection region determined.

3. The setting apparatus according to claim 1, wherein the detection process detects that the object to be detected has been removed.

4. The setting apparatus according to claim 1, wherein the processor determines the polygon corresponding to the object to be detected, based on the blocks into which the first image and the second image are divided and in which the first image and the second image are different, and determines the detection region of a second polygon for detecting the change of the third image, by deleting the vertices of the polygon corresponding to the object to be detected on condition that the polygon and the second polygon may overlap at not less than a predetermined ratio.

5. A setting apparatus which sets a detection region for a detection process of detecting a change of an image within the detection region corresponding to an object to be detected, the apparatus comprising:
an interface configured to connect an image capture unit from which a first image in which the object to be detected is present and a second image in which the object to be detected is not present are input; and
a processor, operatively coupled to a memory, and configured to determine a first polygon corresponding to the object to be detected, based on the first image and the second image, and to determine the detection region of a second polygon for detecting a change of a third image, by deleting a vertex of the first polygon on condition that the first polygon and the second polygon may overlap at not less than a predetermined ratio.

6. The setting apparatus according to claim 5, wherein the processor determines the detection region of the second polygon with a number of vertices not more than a predetermined number.

7. A method for determining a region in a setting apparatus which sets the region for detecting a change in the region of an image caused by a removal of an object which has existed in the region, the method comprising:
inputting a first image in which the object does not exist and a second image in which the object exists, from an image capturing unit;
determining the region corresponding to the object which exists in the second image, based on the first image and the second image; and
setting the region for detecting a change in the region of a third image caused by a removal of the object which has existed in the second image,
wherein a region of a first polygon corresponding to the object is determined, based on blocks into which the first image and the second image are divided and in which the first image and the second image are different, and the region of a second polygon for detecting the change in the region of the third image is determined by deleting a vertex of the first polygon on condition that the first polygon and the second polygon may overlap at not less than a predetermined ratio.

8. The method according to claim 7, further comprising allowing a user to change the region determined.

9. The method according to claim 7, wherein the region with vertices of not more than a predetermined number is determined based on the first image and the second image.

10. A method for determining a detection region in a setting apparatus which sets a detection region for a detection process of detecting a change of an image within the detection region corresponding to an object to be detected, the method comprising:
inputting a first image in which the object to be detected is present and a second image in which the object to be detected is not present, from an image capturing unit;
determining a polygon corresponding to the object to be detected, based on the first image and the second image; and
deleting vertices of the polygon in increasing order of distance between a vertex of the polygon and a straight line connecting two vertices adjacent to the vertex such that the detection process of detecting the change in a third image is performed within the detection region of the polygon with the vertices of not more than a predetermined number.

11. A method for determining a detection region in a setting apparatus which sets a detection region for a detection process of detecting a change of an image within the detection region corresponding to an object to be detected, the method comprising:
  inputting a first image in which the object to be detected is present and a second image in which the object to be detected is not present, from an image capturing unit;
  determining a first polygon corresponding to the object to be detected, based on the first image and the second image; and
  determining the detection region of a second polygon for detecting a change of a third image, by deleting a vertex of the first polygon on condition that the first polygon and the second polygon may overlap at not less than a predetermined ratio.

12. The method according to claim 11, wherein the determining determines the detection region of the second polygon with a number of vertices is not more than a predetermined number.

13. A non-transitory storage medium storing a computer program for setting a region for detecting a change in the region of an image caused by a removal of an object which has existed in the region, the computer program comprising:
  inputting a first image does not exist and a second image in which the object exists, from an image capturing unit;
  determining the region corresponding to the object which exists in the second image, based on the first image and the second image; and
  setting the region for detecting a change in the region of a third image caused by a removal of the object which has existed in the second image,
  wherein a region of a first polygon corresponding to the object is determined, based on blocks into which the first image and the second image are divided and in which the first image and the second image are different, and the region of a second polygon for detecting the change in the region of the third image is determined by deleting a vertex of the first polygon on condition that the first polygon and the second polygon may overlap at not less than a predetermined ratio.

14. The medium according to claim 13, further comprising allowing a user to change the region determined.

15. The medium according to claim 13, wherein the region with vertices of not more than a predetermined number is determined based on the first image and the second image.

16. A non-transitory medium storing a computer program for determining a detection region in a setting apparatus which sets a detection region for a detection process of detecting a change of an image within the detection region corresponding to an object to be detected, the computer program comprising:
  inputting a first image in which the object to be detected is present and a second image in which the object to be detected is not present, from an image capturing unit;
  determining a first polygon corresponding to the object to be detected, based on the first image and the second image; and
  determining the detection region of a second polygon for detecting a change of a third image, by deleting a vertex of the first polygon on condition that the first polygon and the second polygon may overlap at not less than a predetermined ratio.

17. The non-transitory medium according to claim 16, wherein the determining determines the detection region of the second polygon with a number of vertices not more than a predetermined number.

18. A non-transitory medium storing a computer program for setting a detection region for a detection process of detecting a change of an image within the detection region corresponding to an object to be detected, the computer program comprising:
  inputting a first image in which the object to be detected is present and a second image in which the object to be detected is not present, from an image capturing unit; and
  determining a polygon corresponding to the object to be detected, based on the first image and the second image; and
  deleting vertices of the polygon in increasing order of distance between a vertex of the polygon and a straight line connecting two vertices adjacent to the vertex such that the detection process of detecting the change in a third image is performed within the detection region of the polygon with the vertices of not more than a predetermined number.

19. A setting apparatus which sets a region for detecting a change in the region of an image caused by a removal of an object which has existed in the region, the apparatus comprising:
  at least one processor operatively coupled to a memory, serving as:
  an input unit configured to input a first image in which the object does not exist and a second image in which the object exists captured by an image capture unit; and
  a processor, operatively coupled to a memory, and configured to determine the region corresponding to the object which exists in the second image, based on the first image and the second image, and to set the region for detecting a change in the region of a third image caused by a removal of the object which has existed in the second image,
  wherein the processor determines a region of a first polygon corresponding to the object, based on blocks into which the first image and the second image are divided and in which the first image and the second image are different, and determines the region of a second polygon for detecting the change in the region of the third image, by deleting a vertex of the first polygon on condition that the first polygon and the second polygon may overlap at not less than a predetermined ratio.

20. The setting apparatus according to claim 19, wherein the processor determines the region with vertices of not more than a predetermined number.

* * * * *